United States Patent [19]

Lanteri

[11] Patent Number: 5,382,078

[45] Date of Patent: Jan. 17, 1995

[54] VEHICULAR HEAD ARREST ASSEMBLY

[76] Inventor: Michael A. Lanteri, 39 Wayhill Rd. W., Waterford, Conn. 06385

[21] Appl. No.: 177,559

[22] Filed: Jan. 5, 1994

Related U.S. Application Data

[60] Continuation-in-part of Ser. No. 839,619, Feb. 21, 1992, abandoned, which is a continuation-in-part of Ser. No. 419,122, Oct. 10, 1989, abandoned, which is a division of Ser. No. 120,715, Nov. 6, 1987, Pat. No. 4,880,275, which is a continuation-in-part of Ser. No. 928,823, Nov. 10, 1986, abandoned.

[51] Int. Cl.$^6$ .............................................. A47C 7/38
[52] U.S. Cl. ..................................... 297/395; 297/391
[58] Field of Search ............... 297/395, 391, 397, 400, 297/410, 220, 221

[56] References Cited

U.S. PATENT DOCUMENTS

| | | | |
|---|---|---|---|
| 3,220,770 | 11/1965 | Schaeffer . | |
| 3,253,859 | 5/1966 | Merriman | 297/397 |
| 3,393,938 | 7/1968 | Meyer et al. . | |
| 3,601,445 | 8/1971 | Glynias . | |
| 3,851,919 | 12/1974 | Nagy . | |
| 4,015,542 | 4/1977 | Gutridge et al. | 297/395 X |
| 4,206,945 | 6/1980 | Kifferstein | 297/397 X |
| 4,218,792 | 8/1980 | Kogan | 297/391 X |
| 4,607,886 | 8/1986 | Mazhar | 297/410 |
| 4,619,725 | 10/1986 | Muraishi et al. | 297/391 X |
| 4,828,287 | 5/1989 | Siler | 297/397 X |
| 4,919,483 | 4/1990 | Horkey | 297/395 |
| 5,015,036 | 5/1991 | Fergie | 297/391 X |

Primary Examiner—Jose V. Chen
Attorney, Agent, or Firm—CTC & Associates

[57] ABSTRACT

An improved energy absorbing assembly for permanently mounting on the rear inner surface of a truck cab directly behind the occupants' heads to protect the occupants' heads and necks from impact.

3 Claims, 2 Drawing Sheets

VEHICULAR HEAD ARREST ASSEMBLY

RELATED APPLICATIONS

This is a Continuation in Part of my copending application Ser. No. 07/839,619 filed Feb. 21, 1992, now abandoned, which is a Continuation in Part of Ser. No. 07/419,122 filed Oct. 10, 1989, now abandoned which is a Division of Ser. No. 120,715 filed Nov. 6, 1987, now U.S. Pat. No. 4,880,275 which was a Continuation-In-Part of patent application Ser. No. 928,823 filed Nov. 10, 1986, now abandoned.

BACKGROUND OF THE INVENTION

This invention deals with an energy absorbing head arrest assembly useful for protecting head and neck of driver and/or passenger(s) against injury. The head arrest assembly is especially suitable for mounting to the inside of cab rear wall or window of trucks, station wagons and the like.

Automobiles are required to be equipped with headrests to reduce accident related head and neck injuries. These are typically mounted to the backs of front and rear seats wherein they serve to prevent abrupt head movement to the rear in a rear end impact accident resulting in whiplash stress of the neck. However, in many trucks including pickup trucks and back doors of station wagons such head protection is missing, creating a possibility of injury to the occupant(s) of such vehicles especially in case of a rear end collision.

Certain references of interest are concerned with headrests of one sort or another, yet, none is found to fulfill the above described need adequately, efficiently and effectively as does the head arrest assembly disclosed herein.

U.S. Pat. No. 4,607,886 (Mazhar) teaches a vertically adjustable headrest having a specifically contoured cushion and a backplate attachable to the rear metal panel of a truck cab behind the seat. A portion of the backplate contacts the rear window of the cab with resilient pads. There is no mention of an impact absorbing assembly carrying bonding means as taught by the instant invention.

U.S. Pat. No. 4,206,945 (Kifferstein) discloses a removable disposable head and back sheet comprising a sheet of soft, pliable material provided with a strip of Velcro (trademark) material suitable for attaching the sheet to a public conveyance seat back. The sheet also has adhesive means to position disposable headrests in an envelope formed by the sheet. The entire thrust of the teaching is for temporarily fastening the sheet to seat back and to position the headrests. No consideration is given to permanently mounting the disposable sheet or cushions nor an impact absorbing characteristics mentioned—comfort only.

U.S. Pat. No. 3,220,770 (Schaeffer) discloses a removable automobile headrest for use in combination with a moveable window such as a side window. The headrest comprises a pillow portion and a tab portion that is adapted to be held between the top edge of the window glass and the automobile frame when the window is closed. No permanent attachment is disclosed or contemplated nor are any bonding means employed, nor are any impact absorbing characteristics mentioned—comfort only.

U.S. Pat. No. 3,601.445 (Glynias) teaches a headrest structure that is releasably attachable to a vehicular window by suction cups. The structure projects from the window, and a support structure is provided to support the headrest at various angles relative to the window.

U.S. Pat. No. 3,851,919 (Nag):) discloses a temporary headrest including a bracket that hocks over the top edge of a vehicular window.

U.S. Pat. No. 3,393,938 (Meyer et al.) deals with a headrest including a curved pillow adjustably attached to a curved, U-shaped bracket designed to be placed over the top and front surfaces of a bus or truck seat.

The above references do not provide a headrest to protect the head having the effectiveness, simplicity and versatility of the cushion assembly of this invention nor, it is believed, is there any item of commerce available for the above indicated purpose.

OBJECT OF THE INVENTION

It is, therefore, an object of this invention to provide an improved impact energy absorbing head arrest assembly to restrain the head and neck to help prevent whiplash injury which is mountable against the front, i.e. the inside of a truck cab rear window or wall.

It is another object of this invention to provide an improved impact energy absorbing head arrest assembly that is easily permanently attachable to the inner surface of the rear window or wall of pickup trucks and the like.

It is still another object of this invention to provide an improved impact energy absorbing head arrest assembly affording improved safety for drivers and passengers of trucks including pickup trucks.

The foregoing and other objects of this invention will become apparent by the following description and claims.

SUMMARY OF THE INVENTION

A pad assembly which is permanently mounted to the inside of the rear wall and or rear windrow of a vehicle with a cab enclosure directly behind the occupants of the vehicle. The improved head arrest assembly's sole function being to protect the head and neck by absorbing the energy associated with vehicular accidents, thereby eliminating whiplash. It is not a pillow or cushion in the usual sense whose sole function is creature comfort. The material of the head arrest of the instant invention is not resilient but rather has a large hysteresis loss characteristic thereby capturing impact energy then slowly releasing the same. Resilient cushions have the opposite effect, i.e. returning impact energy at the same rate that it originally was imparted in effect fostering whiplash. Additionally, the energy absorbing core obviates the need for a rigid backplate to support it and when affixed to a truck cab rear window to spread impact energy over a large area to prevent shattering of the glass.

The improved energy absorbing head arrest assembly of this invention is composed of a flexible skin, an energy absorbing core, a flat back onto which an activatable permanent adhesive layer has been applied to permanently mount the assembly.

The improved energy absorbing head arrest of this invention may be manufactured by separately forming the flexible skin, energy absorbing core, with a flat back onto which an activatable adhesive agent has been applied. These components are assembled and adhered to each other to form a single nonseparable assembly which is permanently bonded to the rear inner surface of a truck cab directly behind the driver and passenger.

The improved energy absorbing head arrest of this invention may alternatively be manufactured by molding a cover of elastomeric material, inserting the same into a mold and forming the energy absorbing core in situ in the mold.

DESCRIPTION OF THE INVENTION

Although it is mandatory in this country as well as in many other countries that passenger vehicles have energy absorbing cushions for the protection of driver and passenger(s) against head and neck injuries especially in cases of rear end collision; very rarely are such cushion assemblies found on trucks, pickup trucks, rear doors of station, wagons or industrial vehicles. In many instances, there is relatively little space between driver seat or bench and the rear wall or rear window of the cabin portion of a truck. This appears to hold true for all kinds of trucks such as pickups, panel trucks, platform trucks, stake trucks, tractors, industrial vehicles such as forklift trucks, back hoes and the like which have enclosed cabs.

The invention fulfills the need for improved protection for the neck and head for people riding in truck type vehicles and accomplishes it in a simple yet most effective manner.

Figure 1:
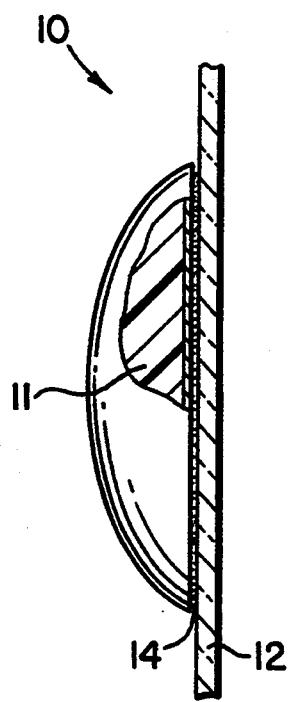
FIG. 1 is an elevated side view of an impact energy absorbing head arrest assembly of this invention mounted against a surface such as a back window pane.

In FIG. 1 an improved energy absorbing assembly 10 of this invention is shown, i.e. an assembly including an energy absorbing layer or core 11 is fastened onto rear wall or rear window 12 of a truck (not shown) by means of an activatable permanent adhesive agent layer 14.

Figure 2:
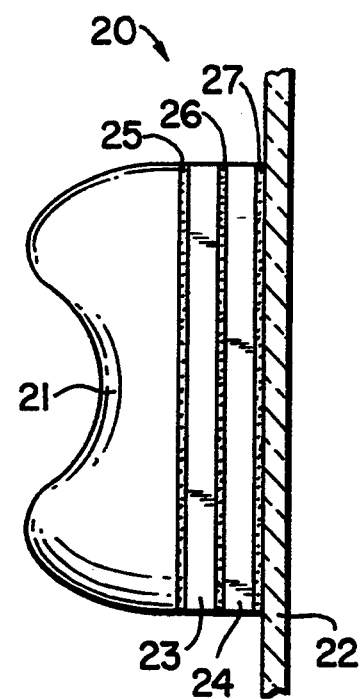
FIG. 2 is an elevated side view of a contoured impact energy absorbing head arrest assembly with several standoffs attached to a rear window of a pickup truck.

FIG. 2 indicates an assembly 20 of this invention including a contoured face 21 which is attached to a first extension standoff or filler panel 23 by permanent adhesive layer 25, the first extension standoff 23 in turn being fastened to a second extension standoff 24 by permanent adhesive layer 26. Second extension standoff energy absorbing assembly 24 is mounted against the inside of a truck cab rear window 22 by permanent adhesive layer 27. The standoff indicated above provide means for making up the variation of distances from the rear window by bridging the distance between a rear window or wall of a truck cab and the back of the occupants seats. It is understood that the extension standoffs are constructed using the same energy absorbing material as is used in the improved head restraint assembly of the instant invention.

Figure 3:
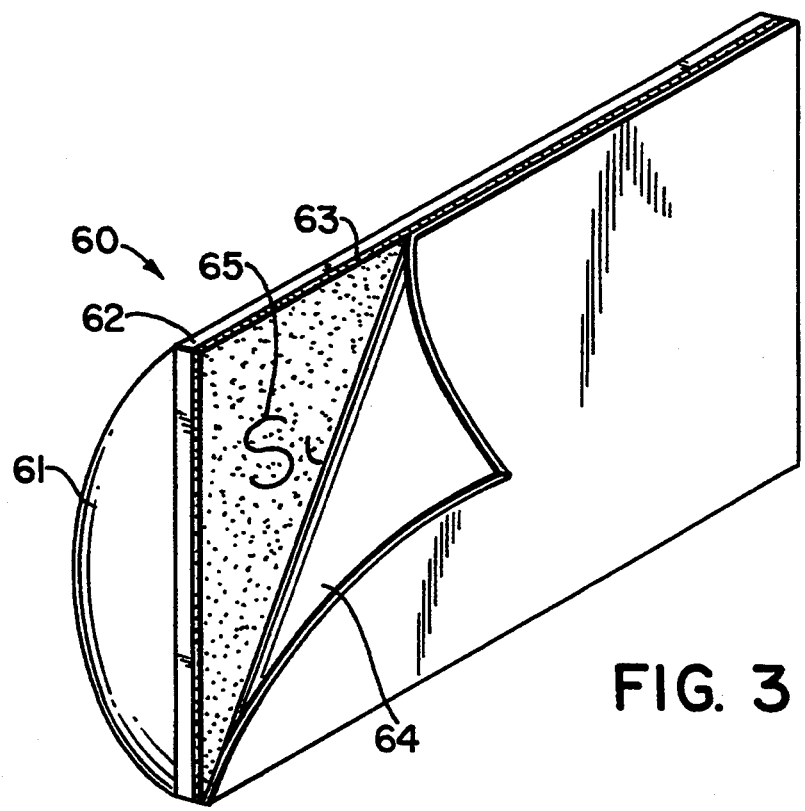
FIG. 3 is an elevated perspective view of an impact energy absorbing head arrest assembly of this invention.

FIG. 3 provides an illustration of a possible assembly 60 comprising an energy absorbent core 61 permanently adhered to a backplate 62 which carries ultraviolet light activatable, moisture activatable permanent adhesive or permanent two component adhesive layer 63 protected by coverstrip 64 (partially peeled off). Backplate 62 may optionally carry a design such as writing or ornamentation 65 as partially indicated and visible when attached to the rear window of a truck cab. In that instance the permanent adhesive must be transparent so as permit viewing. In order to fasten headrest assembly 60, coverstrip 64 is fully removed. Then the headrest 60 is pressed against the surface of the desired location. The permanent adhesive layer having sufficient initial adhesion to hold the device in position during the curing of the activatable adhesive layer to form a permanent bond.

Adhesives in general are well known in the art. However, in this instance the adhesive must be able to withstand both heat, cold, exposure to sunlight and moisture which may condense on the truck rear window. Preferred adhesives to permanently mount the assembly onto a truck cab's flat rear window or rear wall would be those that form a chemical attraction or bond with the glass or metal. Such adhesives include ultraviolet light activatable and bound moisture activated adhesives, i.e. water adsorbed onto the surface of the glass and absorbed into the glass matrix. Such adhesives are used to fasten rear view mirrors to the interior of the front windshield. Also two component bonding systems which will chemically cure and permanently adhere to either glass or metal are useful. Two component epoxies are a well known variant of this type of adhesive. In this instance the preferred mode of application parts A and B are incapsulated in microspheres which break and release their contents on removal of the cover strip and mix when applied to a flat surface.

Figure 4:
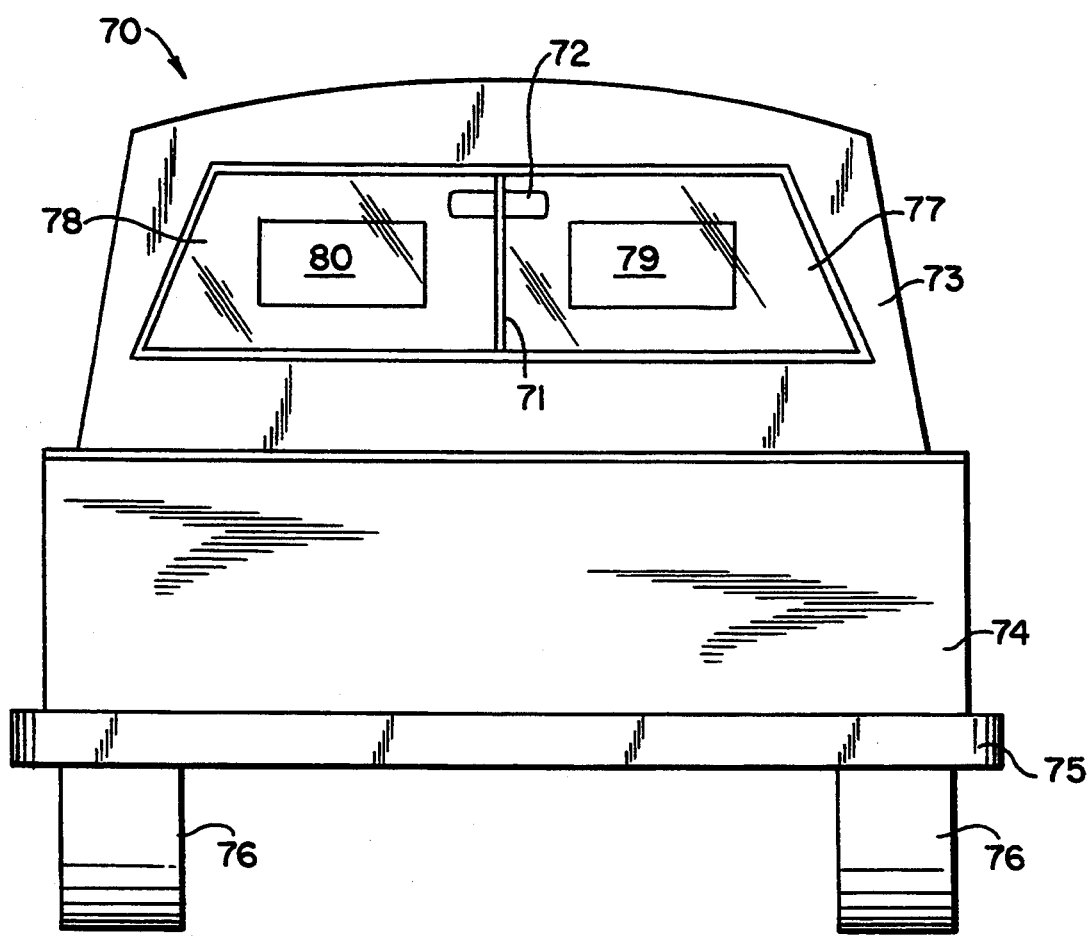
FIG. 4 is an elevated back view of a pickup truck having attached to the rear window of the cab two impact energy absorbing head arrest assemblies of this invention.

FIG. 4 represents the rear view of a schematically drawn pickup truck 70, having a cab 73, a rear end of cargo box 74, a rear bumper 75 and rear wheels 76, a right rear window 77 and a left rear window 78, both separated by a divider 71. Right and left head arrest assemblies 79 and 80 are attached to right and left rear windows, respectively, with the field of vision from rear view mirror 72 remaining essentially unobstructed.

The core of the improved head arrest assembly must be of energy absorbing materials which are not resilient so that they will rapidly absorb impact energy and collapse then slowly over a three to five minute time frame return to the original dimensions. Such energy absorbing materials are usually cellular. The cellular structure developing during cure of the matrix wherein a compounded unexpanded uncured matrix is enclosed in a mold whose dimensions duplicate the shape and size of the finished assembly. In this instance the model having a contoured face and a flat rear portion. As the uncured matrix cures the particulate blowing agents dispersed therein decompose to form nitrogen or carbon dioxide gas thus forming cells which expand the curing matrix against the inner mold walls forming a non-cellular skin. When cure has been completed and the molded article is removed from the mold it is ready for further processing. The elastomer/plastic resins useful for such high energy absorption assemblies include certain grades of rigid polyethylene, rigid polyptopylene and blends thereof; compounds of polyethylene, polypropylene resins with ethylene propylene and ethylene propylenediene elastomers and compounds of polyvinylchloride, polyacrylonitrilestyrenebutadiene (ABS) and nitrile rubber. A commercial grade of the latter is known in the industry as Ensolite (trade name) which was developed as energy absorbing liners for football players' helmets and pads, football goal posts hockey players' equipment, hockey rink sidewalls and the like.

The thus formed molded unit will have a continuous skin which may be further processed by permanently adhering a decorative flexible cover over the molded core and adhering a backplate thereon forming a single assembly. In instances when a backplate is used it's inner surface is permanently bonded to the assembly core and it's outer surface has adhesive applied thereon to be permanently bonded onto the vehicle cab's inner rigid surface such as a window. In the case when no backplate is used, activatable permanent adhesive is applied onto the flat noncellular core rear skin, which is then mounted directly onto the vehicle cab's flat inner surface such as a window directly behind the driver's head.

The inner surface of the backplate may be bonded to the assembly core by a number of well known adhesives or bonding agents. Such adhesives must be chemically compatable with the core and cover material and must form a permanent heat/moisture resistant bond so as not to separate from the backplate which is permanently bonded to the flat rear window or rear wall of the vehicle cab.

An alternate structure may be utilized in the manufacture of the instant invention. Such structure utilizes a preformed elastomeric cover which conforms to contoured front and sides of the energy absorbing core. In this instance the preformed elastomeric cover is inserted into a mold. Depending upon the composition of the cover stock and the uncured, unexpanded core matrix, adhesives may be applied to the elastomeric cover's inner surface prior to molding. This adhesive layer acting to compatabilize two dissimilar matrices, i.e. cover stock of highly polar PVC urethane with nonpolar olefinic energy absorbing core. The unexpanded uncured matrix is then placed in the mold, the mold is then closed and heat or other energy form such as microwave is applied. The matrix then expands to firmly force the cover stock into the mold face, fills the mold which has a flat rear cover and subsequently fuses to the cover and cures in place. As in other methods described herein a noncellular skin forms on the matrix in contact with the flat rear mold cover. The advantage to this method is that the cover may have decorative patterns imposed on its outer side thus eliminating the need for post molding decorative operation.

Another alternative is to post decorate the molded cover with a noncellular skin formed thereon with, for example, a one or two component elastomeric finish or paint. Another alternative is to apply a decorative finish or paint to the contoured front and sides of the mold prior to expanding, molding and curing the compounded core matrix. In this instance the core matrix and paint must be chemically compatable to insure permanent adhesion between the two entities. For example the paint being a low molecular weight two component polyurethane elastomer and the core material being formulated with PVC, ABS and nitrile rubber so that when the finish and core cure they fuse together.

As illustrated in FIG. 4 two independent impact energy absorbent assemblies are mounted against the back window of a pickup truck; it will be understood that. depending on the configuration i.e. whether the back of the truck cab is one uninterrupted wall or window, in which case one single assembly of appropriate length may be applied for the intended purpose.

As already indicated above, the one piece impact energy absorbent assembly of this invention is very useful for application in trucks and station wagons (especially in the latter if, for instance, children are occupying the cargo space) and possibly where the general protection of the human body or of fragile material is desired such as in truck cargo boxes or truck trailers.

Although thee may be many non-substantial changes and/or variations of the assembly of this invention, such as shape, material, use, etc., it is believed that they fall well within the scope of the appended claims.

What is claimed is:

1. An improved energy absorbing head restraining assembly for truck cabs adapted to bridge the variable distances between said truck cab's rear inner wall and occupant seating comprising an energy absorbing skin covered core and multiple filler panels, said skin covered core having a flat back and contoured front and sides, said multiple filler panels conforming to the dimensions of said core flat back; said filler panels having front, side and rear portions, said front and rear portions of sale multiple filler panels having permanent adhesive applied thereon, said filler panel's side portion having a skin thereon, a first of said multiple panel's rear portion adhereing to said truck's rear inner wall, a second of said multiple filler panel's rear portion adhering to said first adhered filler panel front portion said skin covered core flat back adhereing to said second filler panel's front portion thereby forming said improved energy absorbing head restraining assembly permanently adhered to said truck cab's inner wall.

2. An improved energy absorbing heed restraining assembly adapted to bridge the variable distances between said truck cab's rear inner wall and occupant seating according to claim 1 wherein said permanent adhesive is selected from a group of activatable adhesive consisting of ultraviolet light activatable permanent adhesive, moisture activatable permanent adhesive and two component activatable permanent adhesive.

3. An improved energy absorbing head restraining assembly adapted to bridge the variable distances between said truck cab's rear inner wall according the claim 1 wherein said multiple filler panels and core are of chemically expanded polymers selected from a group consisting of polyethylene, polypropylene; mixtures of polyethylene, polypropylene and ethylenpropylenedien elastomers; blends of polyvinylchloride, polyacrylonitrile-butadiene styrene polymers; nitrile elastomers and polyurethane elastomers.

* * * * *